(12) United States Patent
Varner

(10) Patent No.: US 9,066,641 B2
(45) Date of Patent: Jun. 30, 2015

(54) TOOL FOR REMOVING ICE AND MOISTURE FROM A SURFACE

(75) Inventor: Donald Varner, Hollister, CA (US)

(73) Assignee: One Pass Water Blade LLC, Hollister, CA (US)

( * ) Notice: Subject to any disclaimer, the term of this patent is extended or adjusted under 35 U.S.C. 154(b) by 385 days.

(21) Appl. No.: 13/176,228

(22) Filed: Jul. 5, 2011

(65) Prior Publication Data

US 2013/0008464 A1 Jan. 10, 2013

(51) Int. Cl.
| | |
|---|---|
| A47L 13/02 | (2006.01) |
| A47L 1/06 | (2006.01) |
| A47L 13/11 | (2006.01) |
| A47L 13/12 | (2006.01) |
| B60S 3/04 | (2006.01) |

(52) U.S. Cl.
CPC . *A47L 1/06* (2013.01); *A47L 13/02* (2013.01); *A47L 13/11* (2013.01); *A47L 13/12* (2013.01); *B60S 3/045* (2013.01)

(58) Field of Classification Search
CPC ......... A47L 13/02; A47L 13/12; A47L 13/08; A47L 1/06; A47L 13/11; B60S 3/045
USPC ............... 15/236.01, 236.02, 236.07, 236.08, 15/245; D32/41, 42, 46; 134/6
See application file for complete search history.

(56) References Cited

U.S. PATENT DOCUMENTS

| | | | | | |
|---|---|---|---|---|---|
| 3,051,975 | A | * | 9/1962 | Schwartz | 15/105 |
| 4,124,915 | A | * | 11/1978 | Schlicher | 15/105 |
| 4,422,206 | A | * | 12/1983 | Brace et al. | 15/236.02 |
| D307,206 | S | * | 4/1990 | Boyd | D32/46 |
| D355,529 | S | * | 2/1995 | Tsai | D4/118 |
| D362,093 | S | * | 9/1995 | Vogt | D32/42 |
| 5,680,668 | A | * | 10/1997 | Kim | 15/236.02 |
| 5,781,957 | A | * | 7/1998 | Scholl | 15/236.02 |
| 7,249,393 | B2 | * | 7/2007 | Marion et al. | 15/236.02 |

FOREIGN PATENT DOCUMENTS

| | | | |
|---|---|---|---|
| DE | 3420639 A1 | * | 12/1985 |
| GB | 1442986 A | * | 7/1976 |

* cited by examiner

*Primary Examiner* — Michael Kornakov
*Assistant Examiner* — Douglas Lee
(74) *Attorney, Agent, or Firm* — Donald R. Boys; Central Coast Patent Agency, Inc.

(57) ABSTRACT

A tool for removing ice and residual moisture from a surface includes a semi-annular attachment having multiple teeth arrayed about the periphery on the forward facing edge thereof, the attachment including a substantially straight-edged scrapper bar disposed laterally across the anterior edge of the attachment opposite the multiple teeth, a semi-annular handle guard affixed to the semi-annular attachment, the handle guard including a laterally disposed handle grip, and a flexible squeegee panel mounted to the semi-annular handle guard along the front peripheral edge thereof, the panel disposed above the multiple tooth array.

1 Claim, 6 Drawing Sheets

TOOL FOR REMOVING ICE AND MOISTURE FROM A SURFACE

BACKGROUND OF THE INVENTION

1. Field of the Invention

The present invention is in the field of aftermarket primarily automotive tools, and pertains particularly to methods and apparatus for removing ice and residue moisture from a surface.

2. Discussion of the State of the Art

In areas affected by harsh winters, ice buildup on glass and metal surfaces is commonplace. Car windshields and car windows often become coated with thick bulky ice during winter months, and therefore must be frequently cleaned of ice before driving is possible. Most consumers use ice scrappers to remove ice from vehicle. A problem with tools of this type is that they are ineffective for removing bulky amounts of ice and generally require a period of preheating of the windshield or window glass before the scrapper works efficiently. Moreover, the straight edge of a scrapper is not designed properly for heavier ice loads.

Therefore, what is clearly needed is a tool for removing ice and residual moisture from a surface that breaks up and separates the ice sheet for more efficient cleaning A tool such as this would require little or no preheating of the surface to remove the ice.

SUMMARY OF THE INVENTION

The problem stated above is that task efficiency is desirable for a tool that removes ice from a surface, but many of the conventional means for removing ice such as a scrapper, also create task inefficiency. The inventors therefore considered functional components of ice and moisture removal tools, looking for elements that exhibit logical interoperability that could potentially be harnessed to provide ice and moisture removal from a surface such as a windshield, but in a manner that would not create extra work or multiple tools.

The present inventor realized in an inventive moment that if, during one pass of a single tool, ice and ice residue be caused to break apart and be subsequently scraped from the surface using fewer motions, significant task reduction might result. The inventor therefore constructed a unique tool for removing ice and residual moisture from a surface that enabled bulky ice to be broken up and lifted off of the surface and residual ice to be scraped up simultaneously while any left over moisture and small ice particles are cleaned up in a second motion over the same area with the tool in the inverted position. A significant reduction in work associated with cleaning the surface of ice, ice residue, and moisture results with no impediment to task efficiency created.

Accordingly, in an embodiment of the present invention, a tool for removing ice and residual moisture from a surface is provided and includes a semi-annular attachment having multiple teeth arrayed about the periphery on the forward facing edge thereof, the attachment including a substantially straight-edged scrapper bar disposed laterally across the anterior edge of the attachment opposite the multi-tooth array, a semi-annular handle guard affixed to the semi-annular attachment, the handle guard including a laterally disposed handle grip, and a flexible squeegee panel mounted to the semi-annular handle guard along the front peripheral edge thereof, the panel disposed above the multi-tooth array.

A user grips the tool by the handle grip and engages a surface covered with ice with a forward motion to break thick ice using the multi-tooth array, and to scrape residual ice using the straight edged scraper bar, and cleaning off the residual moisture using the flexible squeegee panel with the tool in the inverted position. In one embodiment, the semi-annular attachment is molded from a durable polymer.

In one embodiment, the semi-annular handle guard has an inside diameter that is larger than the outside diameter of the semi-annular attachment and is mounted over the semi-annular attachment using screws. In one embodiment, the multiple teeth are aligned on an arcurate path, the bottom surfaces of the multi-tooth array lying in substantially the same plane. In this embodiment, the plane is set at a relief angle relative to the ice-covered surface.

In one embodiment, the squeegee panel includes T-bar formed along the interfacing edge of the panel. In one embodiment, the tool further includes a pole handle removably attached to the semi-annular handle guard above the handle grip and below the squeegee panel. In a preferred embodiment, individual ones of the multiple teeth are trapezoidal in profile.

According to another embodiment, a method for cleaning ice and residual moisture from a surface is provided and includes the steps (a) gripping a tool including a semi-annular attachment with multiple teeth and a scrapper bar, a handle, and a squeegee panel disposed on the side opposite the multi-tooth array, (b) placing the tool of step (a) down on the surface with the multiple teeth and scraper bar making contact with the ice, (c) urging the tool of step (a) forward on the surface to break ice and scrape residual ice, and (d) urging the tool rearward in inverted position to remove residual moisture using the squeegee panel.

In one aspect of the method, the surface is glass. In this aspect, the glass is a windshield. In one aspect, in step (a), the multiple teeth and the scraper bar have cutting edges facing the same direction. In one aspect, in step (a), a relief angle is provided on the bottom surface of the tool incorporating the multiple teeth. Also in this aspect, in step (c), the scrapper bar edge follows the cutting edge of the multiple teeth.

In a preferred aspect, in step (a), the multiple teeth are aligned on an arcurate path the bottom surfaces of the multi-tooth array lying in substantially the same plane. Also in a preferred aspect, in step (c), the forward motion is repeated over the entire surface. In one aspect, in step (a), the squeegee panel includes a T-bar formed along the interfacing edge of the panel. In one aspect of the method, in step (a), the tool further includes a pole handle. In a preferred aspect of the method, in step (a), individual ones of the multiple teeth are trapezoidal in profile. In a preferred aspect, in step (d), the T-bar of the squeegee panel makes contact with the surface.

BRIEF DESCRIPTION OF THE DRAWING FIGURES

DETAILED DESCRIPTION

The inventors provide a unique tool for removing ice and residual moisture from a surface such as a windshield and like surfaces. The present invention will be described in enabling detail using the following examples, which may describe more than one relevant embodiment falling within the scope of the present invention.

Figure 1:
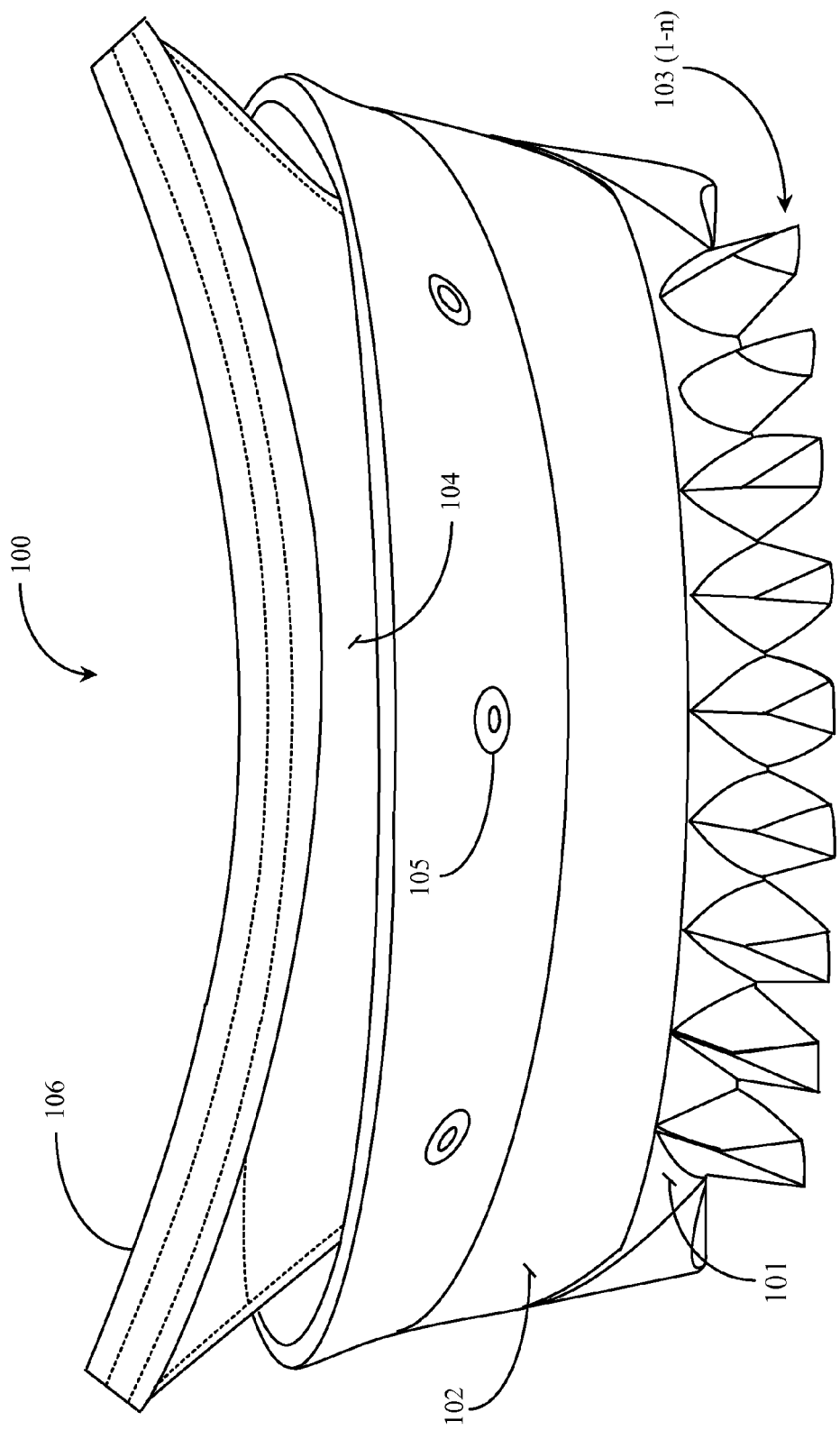
FIG. 1 is a front view of an ice removal tool according to an embodiment of the present invention.

FIG. 1 is a face-on view of an ice removal tool 100 according to an embodiment of the present invention. Tool 100 is adapted as a multipurpose hand-held tool for removing ice and residual moisture from a windshield, window, or other surfaces that have ice buildup from exposure to harsh winter conditions.

Tool 100 has a semi-annular attachment 101 that includes an array of multiple teeth 103 (1-n) that are formed at the forward periphery of the attachment. Teeth 103 (1-n) are generally trapezoidal in shape in this example with forward and slight downward-facing ice breaking and cutting edges. Teeth 103 (1-n) are strategically formed on attachment 101 and form a semi-annular interface designed to cut and lift bulky ice from a surface, and to push the broken ice away from the center of the tool toward the outer edges of the tool. Each tooth 103 (1-n) has a somewhat trapezoidal shape in this example including a common flat bottom surface. The front of each tooth 103 (1-n) has a cutting edge and a lifting surface or land that together function to break or cut and subsequently lift the broken ice off of the ice-coated surface. The sides of each tooth are sloped inwardly and culminate at a top apex ridge line of the tooth running substantially orthogonal to the cutting edge.

Each tooth 103 (1-n) is oriented substantially perpendicular to the radius of the semi-annular attachment so that the center-most tooth points straight ahead and adjacent teeth slant away from the center tooth on either side progressively. The multi-tooth array functions to break up thicker ice by cutting into and under the ice and lifting it from the surface. Likewise, forward urging of the tool displaced the broken ice to either side of the tool. Attachment 101 may be molded from a durable polymer in many embodiments. Attachment 101 is affixed to a semi-annular handle guard 102. Handle guard 102 may also be molded from a durable polymer material. Handle guard 102 includes a handle grip (not illustrated in this view).

A flexible squeegee panel 104 is provided and affixed to the topside of tool 100 directly above the multi-tooth array containing teeth 103 (1-n). Squeegee panel 104 may be molded from a resilient but flexible material such as a silicone-based material, for example. In this example, squeegee panel 104 is attached to the inside wall of handle guard 102 via rivets or screws 105. There are several other ways this attachment may be made. A rigid back plate (not illustrated) is provided in some embodiments as an anchor for the screws. Squeegee panel 104 assumes a generally curved profile following the curve of the inside wall of handle guard 102. Squeegee panel 104 is adapted to be used to wipe up moisture residue after ice has been removed from the ice-coated surface. In one embodiment squeegee panel 104 is used to clean the surface of water whether there was ice on the surface or not. In this regard, tool 100 is a multi-purpose tool.

Figure 2:
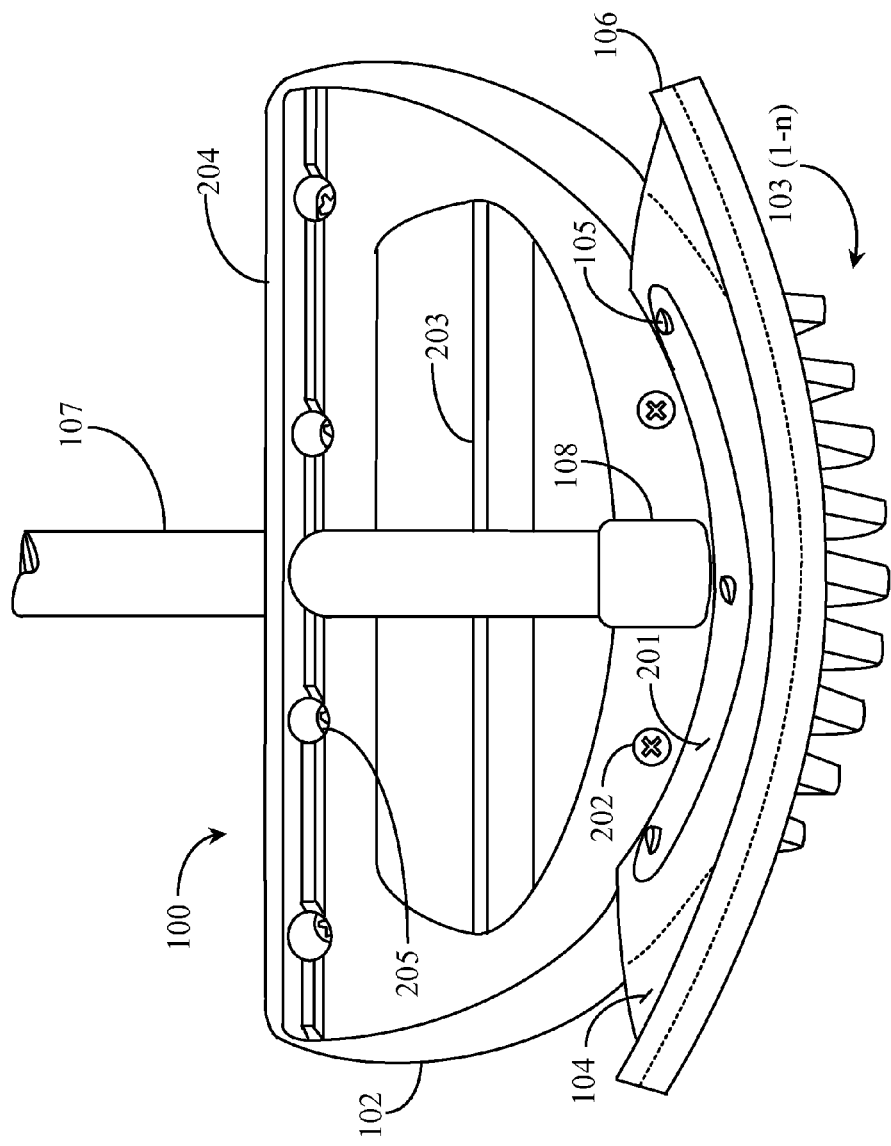
FIG. 2 is a perspective view of the tool of FIG. 1 viewed from the top.

FIG. 2 is a perspective view of tool 100 of Fig. Tool 100 is viewed from the top in this example, and illustrates the semi-annular shape of handle guard 102. A handle grip 204 is provided as a contiguous feature of handle guard 102, or as an attachment screwed on to the handle guard using inset screws 205. The tool may be operated by the handle grip 204 in tooth-down or squeegee down positions. In one embodiment a pole handle 107 is provided to facilitate an extension handle for further reach on a surface being cleaned of ice and/or moisture. Pole handle 107 may, in one embodiment, be threaded on one end and can be inserted through an opening in handle grip 204 and screwed into an annular recess 108 formed when handle guard 102 is attached to semi-annular attachment 101.

Semi-annular attachment 101 includes a substantially straight-edged scraper bar 203 disposed substantially parallel and posterior to the array multiple teeth 103 (1-n). Scraper bar 203 has a scraping edge oriented in the same direction as the cutting edge of the ice-breaking teeth on attachment 102. In one embodiment, the scraper bar is contiguously formed with semi-annular attachment 101. In one embodiment it is attached to handle guard 102 as a separated 15 piece. In this embodiment the scraper bar may be angularly adjusted for bite.

In use of tool 100, the teeth and scraper bar are placed on the ice-coated surface and urged forward. The multi-tooth array cuts, breaks, and displaces bulky ice while the following scraper bar scrapes residual ice that may be left over from the tooth operation. Tool 100 may be inverted and used to squeegee flaked ice and water residue that might be left over from the ice-scraping operation. In this example, a back plate 201 is provided and adapted as a back plate to anchor squeegee panel 104. In one embodiment, squeegee panel 104 includes a T-bar 106 formed about the free edge thereof for ensuring that every part of the surface including curvatures are contacted by the silicone-based material making up the panel. In this embodiment, screws 202 are provided to attach the multi-tooth attachment to the handle guard.

Figure 3:
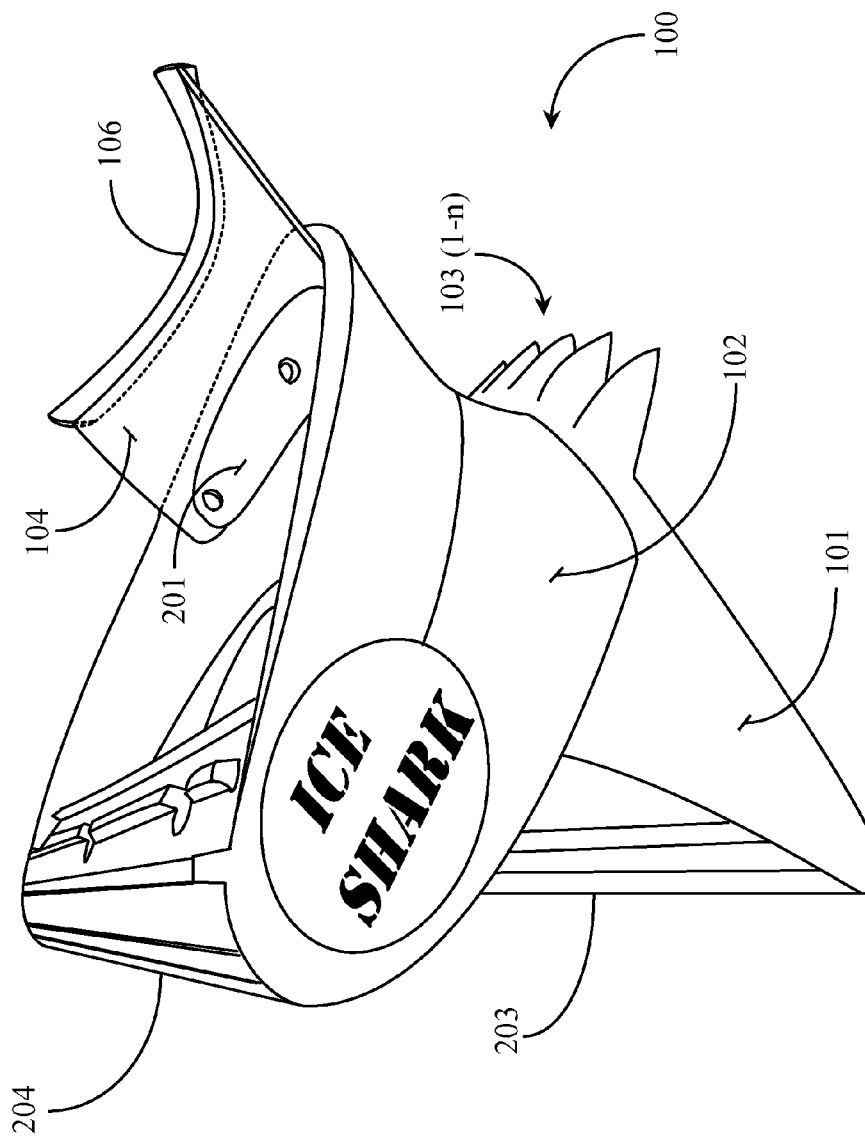
FIG. 3 is a perspective view of the tool of FIG. 1 viewed from the side

FIG. 3 is a perspective view of tool 100 of FIG. 1 viewed from the side, to better illustrate the elements and association of elements. In this view multiple teeth 103 (1-n), scraper bar 203 and handle grip 204 are visible. The inventors term tool 100 "Ice Shark™" and a logo of the same is visible on the handle guard 102. Multi-tooth attachment 101 has a shark tooth and shark fin-like profile when viewed from the side, lending to the name. Also in this view, squeegee panel T-bar 106 is clearly visible along the edge of panel 104. In a preferred embodiment, the biting edges of multiple teeth 103 (1-n) and the biting edge of scraper bar 203 lie in substantially the same plane. An angle for relief is provided for multi-tooth attachment 101 so that in this example only the cutting edges of multiple teeth 103 (1-n) touch the ice coated surface being cleaned of ice.

Figure 4:
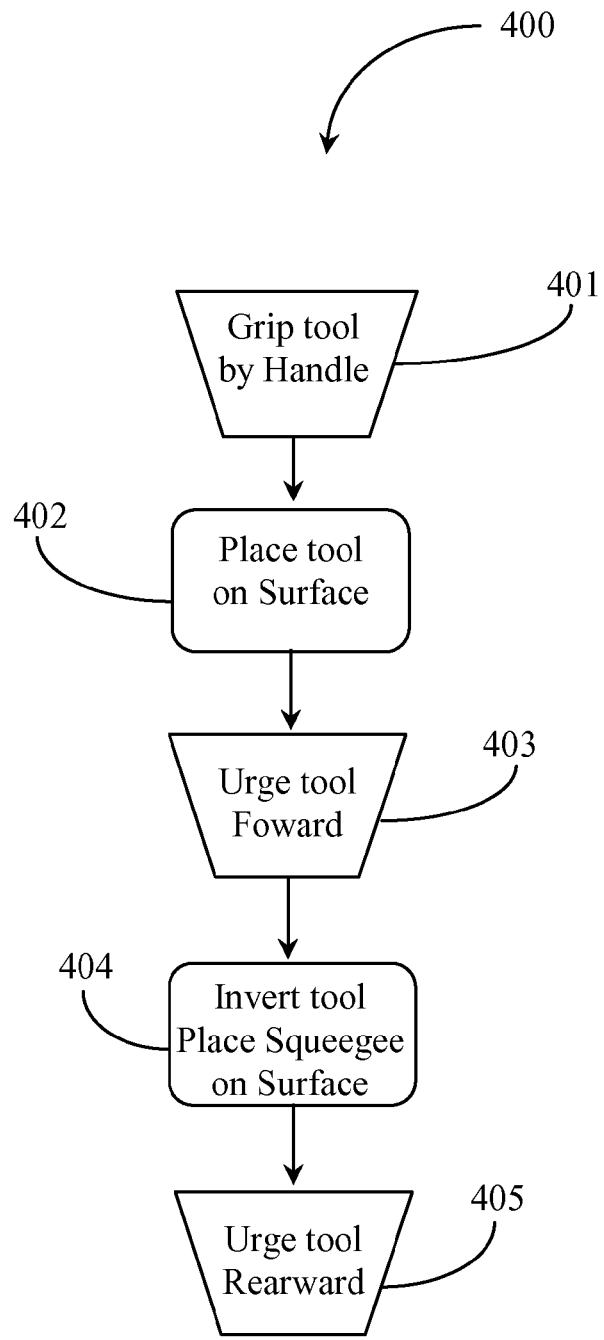
FIG. 4 is a process flow chart illustrating steps for removing ice using the tool of FIG. 1 according to an aspect of the present invention.

FIG. 4 is a process flow chart 400 illustrating steps for removing ice using the tool of FIG. 1 according to an aspect of the present invention. Flow chart 400 includes step 401 whereupon a user determined to remove ice of a windshield, for example, grips the tool by the handle grip. At step 402, the user places the tool against a surface to be cleaned, most likely an automobile windshield.

Referring again to FIG. 3 it will be apparent to the skilled person that a tool for removing ice and residual moisture from a surface is provided, comprising a lower body element symmetrical about a longitudinal plane, having a straight rear edge perpendicular to the longitudinal plane, with a scraper bar implemented across the straight rear edge and facing downward, and a curved front face having a lower edge with a plurality of separate teeth arrayed along the curved lower edge, the array centered on the longitudinal plane, each tooth facing outward substantially orthogonal to the curved lower edge, and each tooth having a straight, forward lower cutting edge and a rearward-sloping surface extending from the cutting edge, the cutting edges of the teeth and the scraper bar lying in a horizontal plane perpendicular to the longitudinal plane, an upper handle-guard element also symmetrical about the longitudinal plane, having a straight rear edge perpendicular to the longitudinal plane, with a handle grip implemented across the straight rear edge, the handle-guard element having a curved front face and an inside curved face, the handle guard element mounted to the lower body element with the inside curved face joining the curved front face of the lower body element, the mounting positioning the handle grip parallel to and directly over the scraper bar, with sufficient space for a user's hand around the handle grip, the handle guard element further providing a hole through the handle grip and a threaded element joined to the inside curved face, enabling a male-threaded pole to be passed through the handle grip and engaged into the female-threaded element, and a flexible squeegee panel mounted to the inside curved face of the upper handle guard, symmetrical around the longitudinal plane, extending upward from the upper handle guard, and ending in a T-bar.

At step 403, the tool is urged forward using a downward pressure to break up thicker ice and displace that ice from the windshield. At the same time, the scraper bar scrapes off the thinner residual ice left over from the multi-tooth operation. Steps 402 and 403 are repeated over the ice-coated surface until all of the unwanted ice has been removed. In one embodiment, preheating is performed during ice removal to weaken the grip of the ice on the surface. Ice is effectively removed by breaking and cutting actions of the multi-tooth array. The ice moves or is displaced to the sides of the tool and up over the cutting edges of teeth 103 (1-n). Scraper bar 203 cleans up the remainder if any is left over from the cutting teeth.

After ice is removed from a surface or surface area, the user may invert the tool and place it on the surface with the squeegee end down at step 404. In this position, the user intends to remove any water and moisture residue from the surface in question. Also in this position downward pressure is not required past a very subtle point. Squeegee panel 104 is optimized by T-bar 106 to conform directly to a curved surface or a surface exhibiting curves, slopes, and other features. At step 405, the user urges tool 100 in a rearward direction to squeegee the windshield of any leftover water or water residue. By combining three tools, multiple tooth array, scraper bar, and a squeegee on a same tool, much extra work and management of more than one tool is avoided. Tool 100 may be used on any ice-covered surface such as glass and metal surfaces of automobiles and other vehicular equipment.

Figure 5:
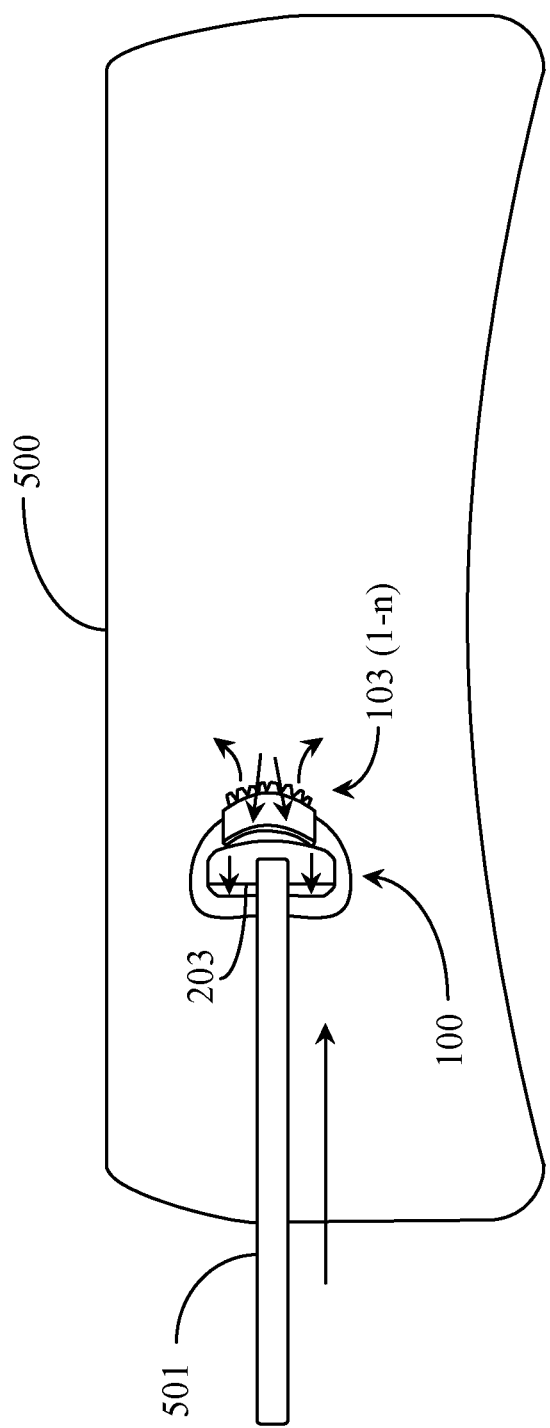
FIG. 5 is a block diagram illustrating use of the tool of FIG. 1 on a windshield to remove ice.

FIG. 5 is a block diagram illustrating use of tool 100 of FIG. 1 on a windshield to remove ice. Tool 100 has an extension pole 501 attached to it in this example. Operation of tool 100 is the same whether the tool is hand-held or extended by use of an extension pole handle. Tool 100 is being used to clean ice from a windshield 500. As a user urges the tool forward, teeth 103 (1-n) cut and break the thicker ice displacing it toward the sides of the tool as indicated by arrows and lifting it up and off of the ice as illustrated by arrows.

Scraper bar 203 is illustrated behind multiple teeth 103 (1-n). As tool 100 moves further forward, residual ice is scraped up off of the surface by scraper bar 203. As indicated by directional arrows, residual ice scraped from the windshield may be displaced over the scraper blade.

Figure 6:
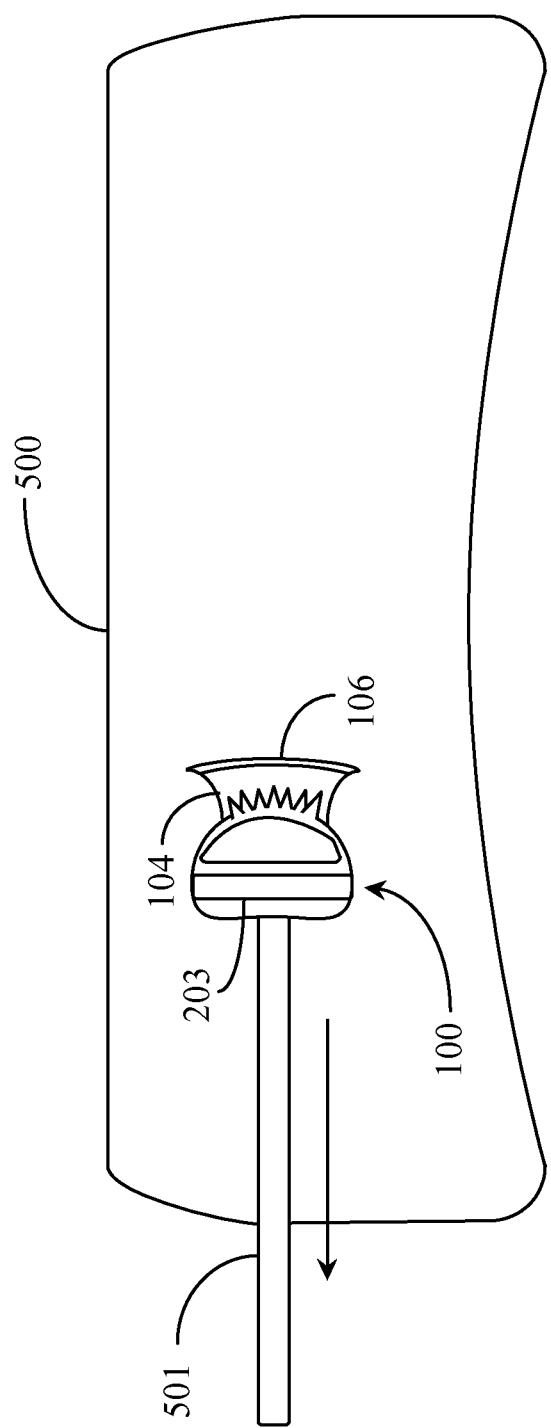
FIG. 6 is a block diagram illustrating use of the tool of FIG. 1 on a windshield to remove residual moisture.

FIG. 6 is a block diagram illustrating use of tool 100 of FIG. 1 on a windshield to remove residual moisture. In this example, tool 100 is inverted to engage the squeegee panel 104 and more particularly squeegee panel T-bar 106 against windshield 500. Tool 100 is urged in a rearward direction from the ice removal operation of FIG. 5. Residual ice particles and water moisture from melted ice is removed after breaking up the heavier ice and scraping residual ice. Squeegee panel 104 aided by T-bar 106 makes contact with windshield 500 and conforms to the curves built in to the windshield.

It will be apparent to one with skill in the art that the ice removal system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:
1. A tool for removing ice and residual moisture from a surface comprising:
a lower body element symmetrical about a longitudinal plane, having a straight rear edge perpendicular to the longitudinal plane, with a scraper bar implemented across the straight rear edge and facing downward, and a curved front face having a lower edge with a plurality of separate teeth arrayed along the curved lower edge, the array centered on the longitudinal plane, each tooth facing outward substantially orthogonal to the curved lower edge, and each tooth having a straight, forward lower cutting edge and a rearward-sloping surface extending from the cutting edge, the cutting edges of the teeth and the scraper bar lying in a horizontal plane perpendicular to the longitudinal plane;
an upper handle-guard element also symmetrical about the longitudinal plane, having a straight rear edge perpendicular to the longitudinal plane, with a handle grip implemented across the straight rear edge, the handle-guard element having a curved front face and an inside curved face, the handle guard element mounted to the lower body element with the inside curved face joining the curved front face of the lower body element, the mounting positioning the handle grip parallel to and directly over the scraper bar, with sufficient space for a user's hand around the handle grip, the handle guard element further providing a hole through the handle grip and a threaded element joined to the inside curved face, enabling a male-threaded pole to be passed through the handle grip and engaged into the female-threaded element; and
a flexible squeegee panel mounted to the inside curved face of the upper handle guard, symmetrical around the longitudinal plane, extending upward from the upper handle guard, and ending in a T-bar.

* * * * *